(12) United States Patent
Dissing

(10) Patent No.: US 9,845,819 B2
(45) Date of Patent: Dec. 19, 2017

(54) METHOD AND SCREW FOR MOUNTING FIBER CEMENT PLANKS

(71) Applicant: Dissing A/S, Skanderborg (DK)

(72) Inventor: Claus Hornstrup Dissing, Ry (DK)

(73) Assignee: Dissing A/S, Stillig (DK)

( * ) Notice: Subject to any disclaimer, the term of this patent is extended or adjusted under 35 U.S.C. 154(b) by 343 days.

(21) Appl. No.: 14/646,901

(22) PCT Filed: Nov. 7, 2013

(86) PCT No.: PCT/DK2013/050366
§ 371 (c)(1),
(2) Date: May 22, 2015

(87) PCT Pub. No.: WO2014/079451
PCT Pub. Date: May 30, 2014

(65) Prior Publication Data
US 2015/0308481 A1 Oct. 29, 2015

(30) Foreign Application Priority Data
Nov. 23, 2012 (DK) .................. 2012 70729

(51) Int. Cl.
F16B 35/04 (2006.01)
F16B 25/10 (2006.01)
F16B 25/00 (2006.01)
F16B 35/06 (2006.01)

(52) U.S. Cl.
CPC ........ *F16B 25/103* (2013.01); *F16B 25/0015* (2013.01); *F16B 25/0063* (2013.01); *F16B 35/065* (2013.01)

(58) Field of Classification Search
CPC F16B 25/103; F16B 25/0015; F16B 26/0063; F16B 35/065
USPC ....................................... 411/387.2, 412, 413
See application file for complete search history.

(56) References Cited

U.S. PATENT DOCUMENTS

| 2,956,470 | A | * | 10/1960 | Knohl | ................. F16B 25/0021 411/387.2 |
| 3,682,507 | A | | 8/1972 | Waud | |
| 4,621,963 | A | * | 11/1986 | Reinwall | ............... E04D 3/3603 411/369 |
| 5,183,359 | A | * | 2/1993 | Barth | .................... F16B 39/282 411/161 |
| 6,558,097 | B2 | * | 5/2003 | Mallet | ................. F16B 25/0031 411/387.6 |
| 6,616,391 | B1 | * | 9/2003 | Druschel | ............ F16B 25/0015 411/187 |
| 6,722,830 | B2 | * | 4/2004 | Forster | ................... F16B 35/06 411/188 |

(Continued)

FOREIGN PATENT DOCUMENTS

CN 102235410 A 11/2011
DE 44 01 908 A1 8/1994
(Continued)

*Primary Examiner* — Gary Estremsky
(74) *Attorney, Agent, or Firm* — David S. Safran

(57) ABSTRACT

A screw and method for the mounting of boards/planks, in particular fiber cement planks, on a support of wood. The screw comprises milling wings and a first thread between the milling wings and the tip, and a second, larger thread with smaller pitch between the milling wings and the screw head.

15 Claims, 5 Drawing Sheets

(56) References Cited

U.S. PATENT DOCUMENTS

| | | | | |
|---|---|---|---|---|
| 8,430,618 B2* | 4/2013 | Baer | ...................... | F16B 35/041 |
| | | | | 411/386 |
| 2007/0059122 A1* | 3/2007 | Lin | ...................... | F16B 5/0275 |
| | | | | 411/412 |
| 2007/0128001 A1* | 6/2007 | Su | ...................... | F16B 5/0275 |
| | | | | 411/413 |

FOREIGN PATENT DOCUMENTS

| | | |
|---|---|---|
| DE | 296 11 749 U1 | 9/1996 |
| DE | 10 2004 018069 A1 | 8/2004 |
| DE | 10 2005 039 744 A1 | 3/2007 |
| DE | 10 2008 048 703 A1 | 3/2010 |
| EP | 2 458 233 A1 | 5/2012 |
| GB | 1 575 194 | 9/1980 |
| WO | 2006/043169 A1 | 4/2006 |

\* cited by examiner

| Correct mounting | Incorrect mounting |
|---|---|
|  |  |

METHOD AND SCREW FOR MOUNTING FIBER CEMENT PLANKS

BACKGROUND OF THE INVENTION

Field of the Invention

The invention relates to a method and screw for the mounting of boards/planks of fiber cement, plastics, composites, and/or other materials with compact and high density, and in general of hard nature, resulting in corresponding brittle characteristics, where internal stresses can cause breakage of the material, especially at imbricated mounting of boards/planks—irrespective of the underlying material on which mounting is performed, it being wood, metal, or other material. The invention particularly relates to a screw and use thereof, the screw having a first thread near the tip of the screw and a second, larger thread near the head and a milling section between the threads for adapting a screw hole to the diameter of the second thread.

Description of Related Art

When boards/planks of fiber cement, among others, are mounted in imbricated configuration, that is, partially overlapping as fish scales, it is customary to use either a nail with a thin, flat head or a countersunk screw, the latter often with different kinds of countersinking fins under the head, such that the screw can also be countersunk in the boards/planks and therewith does not protrude and inadvertently raise the board/plank mounted on top of the fastening.

Nails as well as traditional countersunk screws (with or without fins) exert a pressure of the board/plank against the underlying surface, which is unfortunate because it implies the risk of breakage when mounted in imbricated configuration (imbrication angle), or at least implies stress of the mounted board/plank due to the cavity underneath the board/plank (see FIG. 1 under "improper installation" and FIG. 2). In addition, the tensile stress created by the nail when penetrating the fiber cement plank implies a high risk for cracks in the plank.

Particularly, when using traditional countersunk screws (with or without fins), there occurs, in addition, often, risk of cleavage of the board/planks because the mount is often relatively close to the edge. The cause is pressure of the pre-stressing of the screw toward the underlying surface as well as internal pressure as a result of the penetration of the screw into the material (see FIG. 3).

Although, the screw or nail presses material radially aside from the penetration hole by pressure in the radial direction, the corresponding expansion of the material leads to a tangentially directed tensile stress around the hole, which implies a high risk for cracks in the fiber cement plank or leading to breakage.

Furthermore, nails also have several other undesirable characteristics, including the fact that, during assembly, a hammer is beaten towards a relatively fragile board/plank, where only a single failing hit can cause great damage; additionally, nails cannot be pulled out if they enter little too far (see FIG. 4 of "defective installation").

In general, the variety of screws is vast, and different types of screws are specifically produced for certain uses. Often variations of screws appear small at first sight, however, the importance of special screw designs may be very large despite such very small differences among screws. Due to this very specialized design of screws targeting very specific uses, it is customary to use a screw that is dedicated for one specific type of use only in this specific field and not in neighboring specialized field. Screws for specific uses imply the following examples.

One type of examples is distance screws. Distance screws are built up by similar principle of two threads of different diameter but equal pitch, a milling section between the threads, and a head which is entering the panel, either because it is as narrow as the screw or due to fins that countersink the head.

German utility model DE 296 11 749 discloses a distance screw which has two different threads, a narrower one for the wall and a wider one for the panel or frame that is to be fastened to the wall. In order to keep the distance constant between the wall and the panel or frame, the threads need to have the same pitch. The screw as disclosed in this utility model has a milling section between the threads in order to adjust the hole diameter in the panel or frame to a precise value. In order for the screw to enter the frame or panel without pulling the frame or panel towards the wall, the screw has no head with a diameter larger than the screw diameter. The latter is also an important feature. A similar configuration for a distance screw is disclosed in German patent publication DE 44 01 908, although it comprises milling wings, whereas the German utility model DE 296 11 749 discloses milling ribs. In contrast to the German utility model DE 296 11 749, where no plugs are used in the wall for the screw, because the screw is configured to cut its way into concrete, British patent specification GB 1575194 discloses such screw with a plug in the wall, which is a traditional way for mounting frames. The screw in GB 1575194 is used for panels, for example of wood, wood shavings, plastics, or asbestos cement. These screws without a head that has a larger diameter than the stem of the thread are not suitable for quick mounting of thin fiber cement planks, as there is a risk that the screw is screwed all the way through the plank/board without stopping the mounting at the correct instance. Also, the lack of proper head implies the risk of the plank not being held properly against the underlying material. Therefore, for fiber cement planks/boards, screws are traditionally provided with relatively large heads.

In German patent publication DE 10 2004 018 069, a distance screw is disclosed with two threads and milling section between the threads, as well as a head that is wider than the screw. The wider head is provided in order to have a more stable holding of the panel against the wall. In order not to displace the panel during screwing, the head has milling fins underneath the head, which assist in countersinking the head into the panel. Alternatively, in DE 10 2004 018 069, the head has a hollow underside, but without milling fins. As the underside of the head of this screw is conical, such a screw is also not suited for fiber cement planks/boards, because the conical underside would induce radial pressure and, as explained above, tangential tensile stress, which could lead to cracks and breakage.

U.S. Pat. No. 3,682,507 by Waud discloses a different type of screw, specifically for insulation panels that have a soft foam and a thin sheet of metal on that side of the insulation panel that is remote from the wall. The screw has a drill tip for drilling through the metal sheet and the wall during mounting of the insulation panel against a wall. The screw comprises three sections of threads. During mounting procedure, the drill tip drills a hole in the outer metal sheet of the insulation material, the first thread is penetrating the insulation material through the drilled hole in the metal sheet, after which milling wings enlarge the hole in the metal sheet and a second thread engages with the rim of the hole in order to control the penetration speed of the screw through the soft insulation panel. This controlled speed is useful in order not to damage the drill tip when impinging on the wall. Once, the drill tip drills into the wall and the first thread engages with the wall, the third thread just below the head of the screw engages with the metal sheet. During the mounting, the metal sheet may have been slightly deformed in a local area around the hole due to press against it with the drill tip. In order not to maintain compressed insulation material below the hole, it is necessary to return the local area to the correct distance from the wall; for this reason, the third thread underneath the screw head has a pitch which is higher than the pitch of the first or second thread section, by which the metal sheet, but not the insulation material, is pulled slightly away from the wall and the remaining insulation material and towards the relatively large washer of the head.

As it appears, especially, from the example of U.S. Pat. No. 3,682,507, screws may be configured with very specific features and with dimensions specifically targeting the selected use thereof. For example, the screw of U.S. Pat. No. 3,682,507 would not be useful as a distance screw for overlapping fiber cement panels, such a planks/boards. First of all, the relatively bulky screw head would create a large distance between overlaying panels and prevent mounting of panels close onto each other. However, even with such head countersunk into the panel, the screw would still not make a close overlapping of panels possible, because the screw would not keep the distance between the panel and the wall because the higher pitch at the head region would pull the panels away from the wall in the final mounting step when the lower pitch thread is entering the panel. In this connection, it is pointed out the varying pitch in the screw of U.S. Pat. No. 3,682,507 is not meant to change, especially increase, the distance between the insulation panel and the wall but solely to safeguard that the metal sheet is pulled towards the washer of the head for preventing compression of the soft insulation foam around the screw. As a conclusion, this screw of U.S. Pat. No. 3,682,507 is valuable for soft foam panels but does not appear applicable for mounting overlapping panels of fiber cement.

The above example illustrates that screws with specific features that are developed for one use, are not useful for other uses, despite only minor differences. None of the above screws are properly applicable for fiber cement planks/boards and their mounting in imbricated configuration.

SUMMARY OF THE INVENTION

The objective of the invention is to provide a screw that is an improvement over the prior art. In particular, the purpose is to provide a screw for secure mounting of planks, especially, fiber cement planks, with reduced risk for breaking the plank. A further objective is a screw that is suitable for quick mounting of fiber cement planks/board with a screwing tool.

This object is achieved with a screw as described in the following.

Before describing the screw itself, a few observations in relation to fiber cement planks are described, as these observations and investigations, as part of the invention, have led to the development of the particular screw for fiber cement planks.

Fiber cement is a brittle material, and despite being very resistant against exposure to compressive stress, it breaks relatively easy when being exposed to tensile stress. Such tensile stress can occur as a result of bending of the plank, for example when exposed to pressure against an area of the plank underneath which the plank is not supported. Tensile stress can also occur when bodies are pressed into the fiber cement. This was explained above with respect to the tangential tensile stress that results from the radial pressure created by a screw or nail. Thus, the objective of the invention is a screw that minimizes or even eliminates tensile stress in the fiber cement plank when being screwed through and into the plank. Furthermore, the screw should be able to make mounting of the fiber cement planks on a suitable underlying material, such as a wooden base, easy and quick. These considerations and observations resulted in a screw with multiple integrated features, each features adding synergistically to an overall reduction of failures and plank breakages during mounting. In general, the screw is provided with a milling section and a first thread between the milling section and the tip, as well as a second, larger thread between the milling section and the screw head. In the mounting phase, this milling section minimizes tensile stress from the second thread when it enters the plank during screwing.

In greater detail, the screw has first and second end and an axis extending from the first to the second end. At the second end, it comprises a head for the screwing of the screw with a tool; for example, the head is provided with a slot for cooperating with a corresponding tool, examples are a TORX® notch, a square slot or a crossed slot, or a square or hexagon for a wrench. The screw comprises a first thread with a first inner diameter and a first outer diameter. The screw is provided with a tip at the first end, and, optionally, the first thread is extending directly from the tip. If the first end is provided with a drill tip, the first thread is, optionally, provided as directly extending from the drill tip. Such a drill tip may be provided specifically for drilling in wood, plastics, stone, or metal.

In addition, the screw comprises a milling section between the first thread and the head, wherein the milling section comprises milling means, for example milling ribs or milling wings, for increasing the diameter of a hole into which the screw is screwed. These milling means has a circumscribed circle in a plane perpendicular to the axis of the screw for milling a hole with a diameter as the circumscribed circle, wherein the circumscribed circle has a diameter larger than the first inner diameter; i.e., the milling means cut a hole larger than the stem of the first thread at the front part of the screw.

It is pointed out that the diameter of the stem, by definition, is identical to the inner diameter of the first thread.

The screw further comprises a second thread between the milling section and the head, wherein the second thread is larger than the first thread. This second thread has a second inner diameter and a second outer diameter, wherein the second inner diameter is larger than the first inner diameter. This means that the stem of the second thread is thicker than the stem of the first thread. Typically, also the second outer diameter larger than the first outer diameter. Typically, the ratio between the outer diameter of the first thread and the outer diameter of the second thread is 0.5-0.8. Advantageously, the second thread extends to the underside of the head, although a small distance between the underside of the head the thread is possible.

For example, the circumscribed circle of the milling section has a diameter which is between 0.8 and 1.2 times or 0.9 to 1.1 times the second inner diameter. This means that the milling means cut a hole with a diameter that is approximately adapted to the inner diameter of the second thread.

In some embodiments, the milling means have a circumscribed circle that is larger than the first outer diameter, which, however, depends on the difference between the two diameters of the threads and the selection of dimensions in relation to the specific material for the screws to be screwed down into.

For example, the second thread may extend around the stem between the head and the milling ribs or milling wings where the stem is increasing in diameter from the milling section and towards the head. For example, the stem (inner diameter) for the second thread increases conically, approximately conically, or is curved with increasing diameter towards the head. Alternatively, the stem of the second thread is cylindrical. In the event that the second thread has progressively increasing inner diameter and outer diameter in a direction from the milling means and towards the head, the term "the second inner diameter" is to be understood as the maximum inner diameter of the second thread, and the term "the second outer diameter" is to be understood as the maximum outer diameter of the second thread.

The fact that the second thread has a larger diameter has the consequence that the stability of the screw increases towards the head. The latter is an advantage because the screwing of the second thread not only implies those forces that are necessary to screw this particular second thread into the plank, but the second thread also has to take up the forces for screwing the first thread into the underlying material, for example wooden base. Even further, the second thread also has to take up forces from countersinking the head of the screw. The head has a larger diameter than the stem and is countersunk by working it into the material of the plank.

Optionally, the pitch of the second thread is different from the pitch of the first thread. This way, one can obtain a pre-stressing in the screw between the first and the second thread. For example, the pitch of the second thread is between 1% and 25%, for example between 1% and 5%, or between 5% and 25%, or between 8% to 20%, or between 10% and 15% larger or smaller than the pitch of the first thread; typically however, especially for the use in connection with fiber cement planks, it is smaller than the increase of the first thread by the intervals as given above. The smaller pitch (finer thread) leads to a controlled tightening of the plank against the wall and/or against the underlying plank. Optionally, in order to avoid stressing the plank during this tightening in the last phase of the mounting, the length of the second thread is short; typically, less than 5 full turns, for example less than 4 or 3 full turns. Thus, there is only a relatively small controlled tightening possible with the screw. For this reason, it is advantageous if the second thread is shorter than the first thread, for example less than half as long.

As mentioned, the head has an upper side configured for cooperation with a tool. In specific embodiments, there are provided milling fins on the underside of the head, opposite to the upper side, for further cutting and countersinking the head. Although, such fins are advantageous, they are not always necessary and may be avoided.

Small milling fins under a flat head with the function of milling up to make room for a full or partial countersinking are known from prior art, in general. In the present case, this is utilized in a special way under consideration of the properties of fiber cement planks. As outlined above, such fiber cement plates are very stable against compressive stress but break easily when exposed to tensile stress. By providing a head that is flat on its underside, the head, when being screwed into the plank for countersinking, exposes the plank to compressive stress along the axial direction of the screw, where the plank/board is very resistant to compressive stress, and, thus, does not lead to damage. This is especially so, because the compressive strength from the head is counterbalances in the opposite direction from the large windings of the second thread, which results in the forces only being internal compressive forces, not leading to radial and tangential forces. In contrast thereto, as already explained above, if a screw would be used with a head, as disclosed in the aforementioned German published patent application DE 10 2004 018 069, the conical part of the underside of the head would result in tangential tensile stress by pushing the material away from the hole, which has a high likelihood for leading to cracks in the plank.

Typically, the head is relatively flat on the upper side in addition to being flat on the underside, for example with a thickness between the upper side and the underside of 0.5-1.0 mm, and has a diameter that is wider than the second thread, for example, 1.2-2.0 times as wide as the inner diameter of the second thread, such that it also works as a screwing stop, once it enters the fiber cement plank.

Once the head with the flat underside and the milling fins under the head is partly milled and partly pressed into the fiber cement plate such that the upper side of the head is flush with a surface of the fiber cement plate or countersunk below the surface, the emerging compressive forces in the fiber cement in combination with the relatively large resistance against overrev of the larger thread result in an efficient braking and prevention of further rotating of the screw. This efficient stop against further screwing into the material of the fixated screw in the fiber cement is a specific aspect that safeguards that the fiber cement board/plank is not exposed to destructive and cracking tensile stress in the surface of the board/plank above a possible cavity between the fiber cement board/plank and the underlying material.

The effect of the screwing stop has turned out to be especially effective for fiber cement planks as compared to other materials, such as wood. The flat underside of the head results in only providing compressive stress to the fiber cement plate in the axial direction, which is the direction parallel to the longitudinal axis of the screw. As the fiber cement plate is very stable against compressive stress in this direction, the fiber plate acts strongly against this compressive stress and effectively stops the screw head during its countersinking travel into the plank. The fins under the flat head assist in the braking action in the fiber cement material. This has the consequence of very easy mounting, because the screwing machine needs not to be fine adjusted but can be used with high speed and high force. This is in contrast to wooden materials, where such high speed and high force would lead to the screw continuing its way far deeply into the wood. Even in the case of high speed and high force from the screwing machine, the screw is efficiently stopped by the fiber cement; this high speed and high force screwing and efficient stopping puts strong forces on the second thread. However, as the second thread has an increased thickness, it can withstand such forces better than if it had the same diameter as the thinner thread at the tip. The thinner thread, however, has its advantage by allowing an easy entering in the underlying material, such as a wooden base. By the screw, a high mounting speed can be achieved without compromising correct mounting and quality.

Typically, the ratio between the thickness of the head and the inner diameter of the second thread is 0.1-0.3. For example, the thickness of the head is 0.5-1.0 mm, such as 0.7 mm. For example, the inner diameter of the second thread is between 5 and 7 mm. Optionally, the head has a diameter of between 8 and 9 mm, for example 8.70 mm.

As the head is flat and relatively thin, i.e., it has a short height from the upper side to the underside, the screw advantageously has an internal slot, such as a TORX® notch, a square slot or a crossed slot.

Although, the fins in principle can extend to the rim of the head, it has been found that this is not necessary. For example, the ratio between the diameter of the head and the diameter of the largest circle circumscribed around the fins is 1.05-1.40.

Such a screw is particularly useful for fastening of fiber cement planks on an underlying surface, for example, a wood surface and, in particular, to a wall.

Although, the invention is explained and useful for fiber cement plates, the screw applies equally well for other panels/planks/boards that are generally substantially more sensitive to tensile stress than compressive stress, for example have a tensile stress at break which is at least 2, 4, 6 or 10 times lower than the compressive stress at break.

Aspects

In the following, interrelated aspects for a useful screw are described:

1. A screw with a first and second end and an axis extending from the first to the second end; wherein the screw at the second end is provided with a head (G) for screwing the screw with a tool; wherein the screw comprises a first thread (B) with a first inner diameter and a first outer diameter; wherein the screw includes a milling section (C) between the first thread (B) and the head (G), wherein the milling section (C) comprises means for milling with a circumscribed circle in a plane perpendicular to the axis of the screw for cutting a hole with a diameter as the circumscribed circle; wherein the circumscribed circle has a diameter larger than the first inner diameter; characterized in that the screw comprises a second thread (E) between the milling section (C) and head (G) where this second thread (E) has a second inner diameter and a second outer diameter; wherein the second inner diameter is larger than the first inner diameter.

2. A screw according to aspect 1, wherein the second outer diameter is larger than the first outer diameter.

3. A screw according to aspect 1 or 2, wherein the milling means have a circumscribed circle that is larger than the first outer diameter.

4. A screw according to any one of the preceding aspects, wherein the circumscribed circle has a diameter which is between 0.8 and 1.2 times the second inner diameter.

5. A screw according to any one of the preceding aspects, wherein the second thread (E) has an progressively increasing inner diameter and outer diameter in a direction from the milling means (C) and towards the head, and wherein the second inner diameter is the maximum inner diameter of the second thread, and the second outer diameter is the maximum outer diameter of the second thread (E).

6. A screw according to any one of the preceding aspects, wherein the pitch of the second thread (E) is different from the pitch of the first thread (B).

7. A screw according to aspect 6, wherein the pitch of the second thread (E) is between 1% and 25% less than the pitch of the first thread (B).

8. A screw according to any one of aspects 1-5, wherein the pitch of the second thread (S) is identical with the pitch of the first thread (B)

9. A screw according to any one of the preceding aspects, wherein the first end is provided with a drill tip, and the first thread (B) is provided between the drill tip (A) and the milling section (C).

10. A screw according to any one of the preceding aspects, wherein the head (G) has an upper side for cooperation with a tool and an underside that is provided with milling fins (F) to further milling and countersink of the head (G).

11. Use of a screw according to any one of the preceding sepacts for fixing fiber cement planks on an underlying material.

The invention is explained in more detail with reference to the drawings.

DETAILED DESCRIPTION OF THE INVENTION

Figure 1:
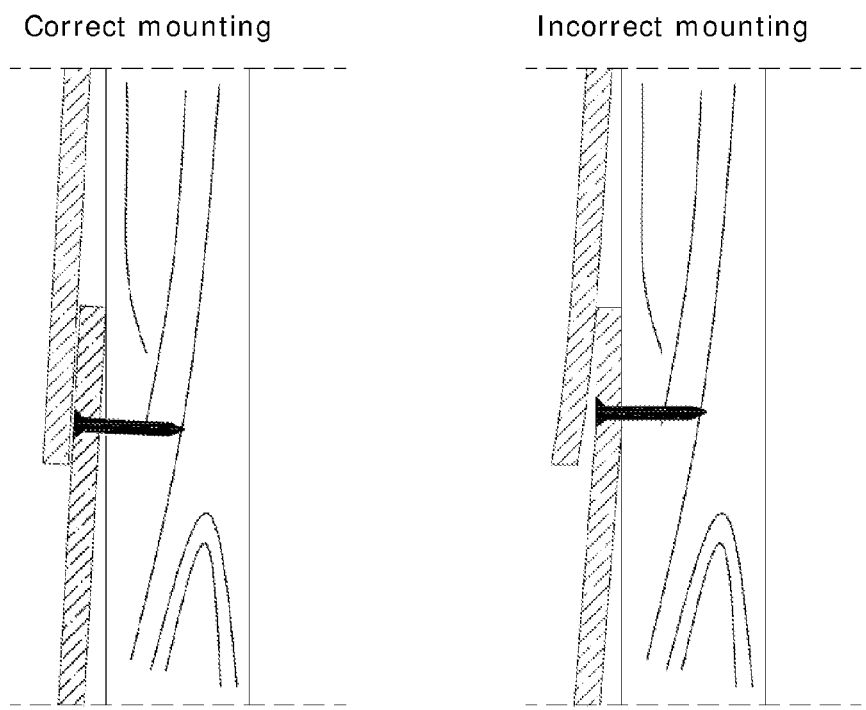
FIG. 1 shows imbricated mounting of planks on a timber base.
Figure 2:
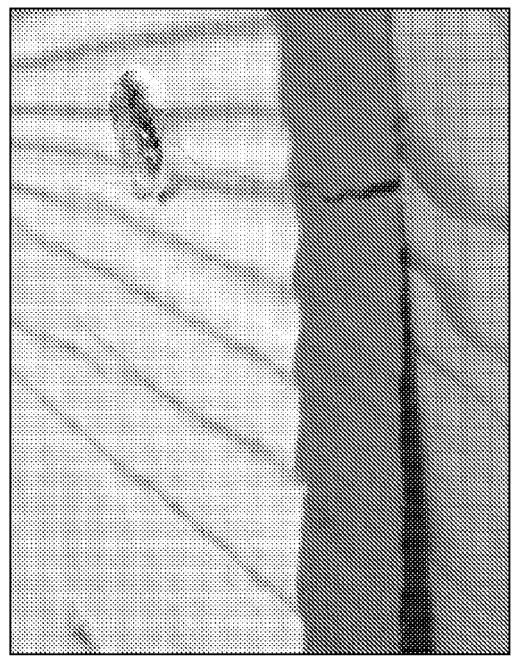
FIG. 2 shows a photograph of a broken fiber cement plank.
Figure 3:
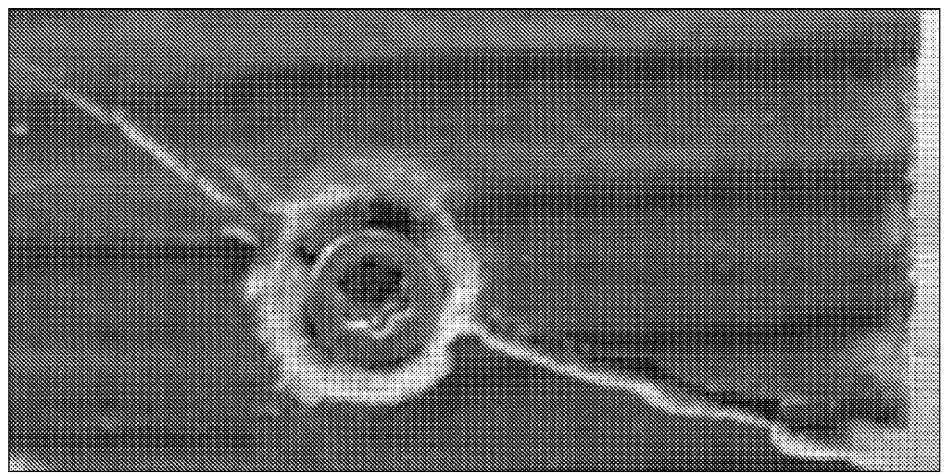
FIG. 3 shows a photograph of another broken fiber cement plank.
Figure 4:
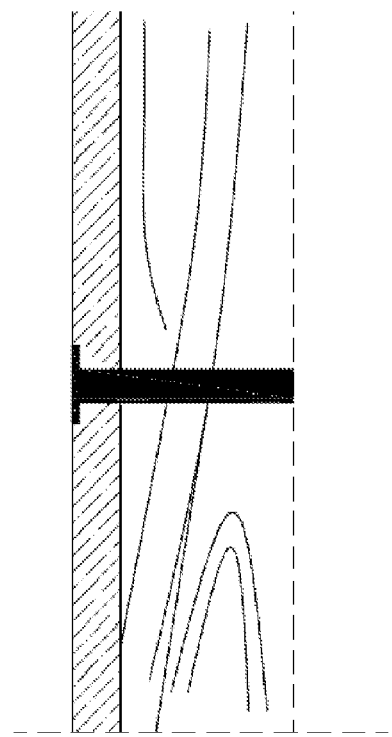
FIG. 4 shows a sketch of the mounting board.
Figure 4:
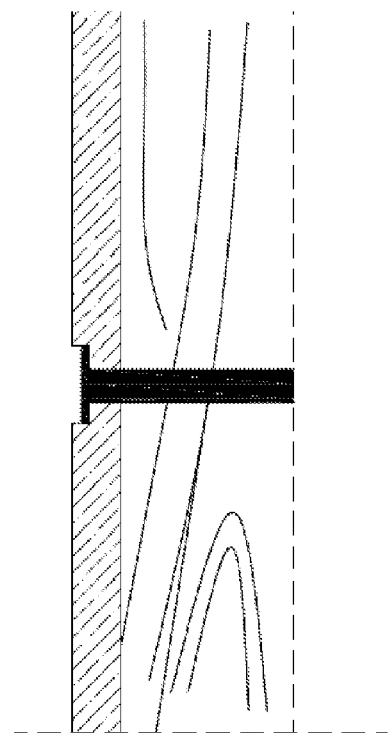
Figure 5:
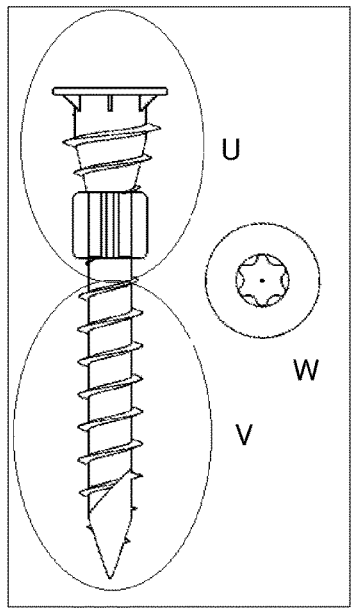
FIG. 5 shows the screw.

The screw is characterized by a particular configuration of head and upper part of the screw body (see FIG. 5, Region U), followed by more traditional thread and tip of the screw (see FIG. 5, Region V)—both depend on the underlying material, into which the mounting is to be made. All the used images/figures for this application, illustrate a screw with a special tip and thread suitable for penetration of fiber cement boards/planks and mounting onto a wooden base. Furthermore, all images/figures show a screw with Torx (6-lobe) slot (see FIG. 5, illustration W). Other types of slot could also be used and depends primarily on the type of slot that is typically used in the geographical area.

Figure 6:
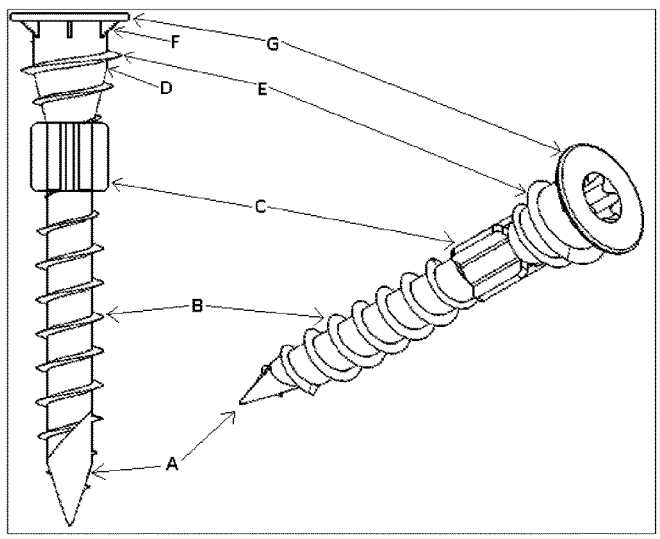
FIG. 6 shows the screw in oblique perspective.
Figure 7:
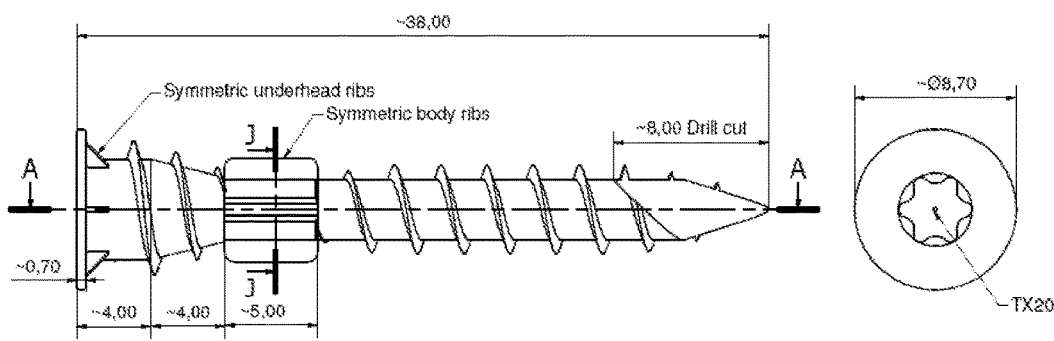
FIG. 7 shows some of the possible dimensions of the screw.

During mounting, the drill tip A of the screw, as illustrated in FIG. 6, drills through the board/plank and then into the underlying base, where the first thread B takes over and starts driving-in the screw. Instead of the head of a normal prior art countersunk screw being pressed into the board/plank during screwing and causing disadvantageous pressure against the board/plank, by the screw as illustrated in FIG. 6, the hole in the board/plank is cut by the vertical ribs/wings F (number not important, but minimum 2) that follow the first thread B, such that the diameter of the hole is now increased to approximately to the inner diameter D of the second thread E at the head G of the screw. While the screw continues its passage down into the underlying material as a function of the lower part of the first thread B, the second thread E at the head G of the screw catches the board/plank and cuts itself into it. This provides a good "grip" in the board which thereby is fixed on the screw by the second thread, instead of being pressed against the underlying material. Finally, the small milling fins F cut the edge of the hole slightly, whereby the very edge of the screw head G can lay almost flat against the board/plank and thus complete the installation. The vertical ribs/wings C can be in the format as shown in FIGS. 6 and 7, but can also have different shape (for example, pear-shaped, spiral-shaped, slanted, or jagged) if only they cut the hole to the desired diameter. For example, an alternative shape is illustrated in FIG. 8.

As can be seen from FIG. 6, the second thread D has a stem of constant diameter near the head G, and the screw has an increasing conical progression from the milling section C to this stem of the second thread D. The second inner diameter of the second thread D is, thus, equal to the diameter of the stem for the second thread, and the second outer diameter of the second thread is, thus, equal to the outer diameter where the second thread winds around the stem. In the example of FIG. 8, the outer diameter of the second thread is the largest diameter of the gradually increasing stem.

Exemplary dimensions of a screw is as follows:
Length of screw: 20-100 mm, optionally 30-50 mm
Length of drill tip 4-24 mm, optionally 6-10 mm
Length of the first thread of 12-75 mm, optionally 20-40 mm
Length of the milling section 3-15 mm, optionally 3-7 mm
Length of the second thread 4-30 mm, optionally 6-8 mm; for example, divided between 4 mm along the screw's conical part and 2-4 mm along the stem of the second thread close to the head.

Figure 8:
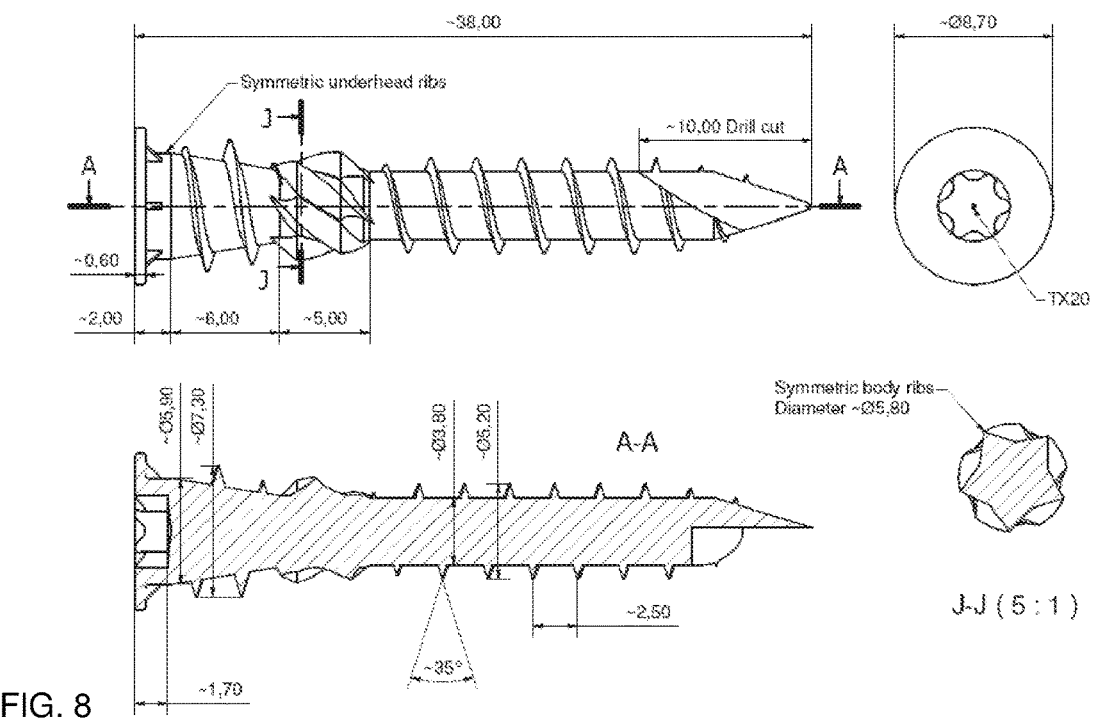
FIG. 8 shows some alternative dimensions of the screw.

FIG. 7 and FIG. 8 show examples of dimensions in millimeters of useful screws. It appears from the shown specific embodiments, that the second thread is relatively short by comprising only a few turns in the winding between the milling section and the head. For example, the length of the second thread (E) is 4-10 mm and comprises less than four full turns of winding. For example, as illustrated in FIGS. 7 and 8, the winding is less than three full turns. It is also pointed out that the milling ribs in FIG. 7 are parallel to the axis, and the ribs in FIG. 8 are twisted.

Figure 9:
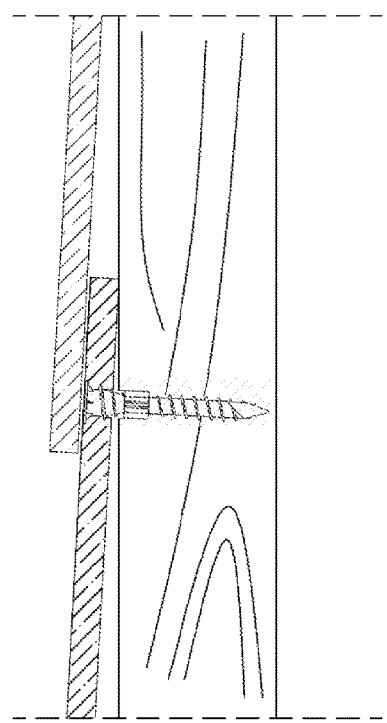
FIG. 9 shows the screw screwed into an underlying surface

FIG. 9 shows the screw screwed into a substrate, for example, fiber cement planks on a timber base.

There are several elements of the prior art contained in the screw, but the combination of these elements is new and creates very unique features that are useful for panels that are more sensitive to tensile stress than to compressive stress, especially fiber cement boards/planks. The function of the screw is dominated by the new aspects as explained in the following. Vertical or slanted ribs/wings have a function of deburring the hole or drilling oversized hole in plastic sheets, for example, in order to ensure material movement around the stem of the screw at temperature variations, or to ensure clearance for the thread while being drilled in the underlying material, for example steel.

Axially directed, slanted, or spirally twisted wings or ribs, for example as illustrated in FIGS. 6, 7, and 8 are used for cutting a hole specifically for a subsequent thread. The spirally twisted wings as illustrated in FIG. 8 assist in removing milled material.

The combination of two different thread diameters on a screw is known in the art and used particularly for screws used to mount sandwich panels (the upper thread is used here to lift the top plate against the sealing washer, as in the above mentioned U.S. Pat. No. 3,682,507, or for so-called adjustment screws or distance screws, where the top thread is used to adjust such a frame towards or away from the wall and/or maintain a given distance between the frame and the wall.

In the context of the invention, two such different thread diameters are used to achieve retention of boards/planks without pressure onto the board/plank. There is, thus, used a screw for attaching planks in which the screw is provided with milling ribs or milling wings and a thread between the tip and the milling ribs or milling wings and a thread between the milling ribs or milling wings and the head of the screw. In particular, the thread between the milling ribs or milling wings and the head is wider than the thread between the milling ribs or milling wings and the tip, which allows using a thin first part of the screw, yielding less internal stress. The large head is used for the transfer of sufficient screwing power in the hard materials as well as for stopping the screw power both inertia-wise and poser-wise in the hard fiber cement as well as in the underlying material, typically wood.

The advantage of the use of the screw is the possibility of controlling the tension in the mounting of a plank against a base and internal stresses in the material, in particular when mounting of fiber cement planks on a timber base.

In practice it has been found that a TORX® screw size 20 is very advantageous in relation to a TORX® size of 15 for turning the screw into the substrate, why the screw advantageously is provided with a head that has a corresponding notch of a TORX® screw size 20. However, this is only exemplary, and the slot has to be selected in accordance to the size of the screw head. Useful for the proper countersinking of the screw is the fact that is has an internal slot instead of an upstanding means for cooperation with a tool.

Figure 10:
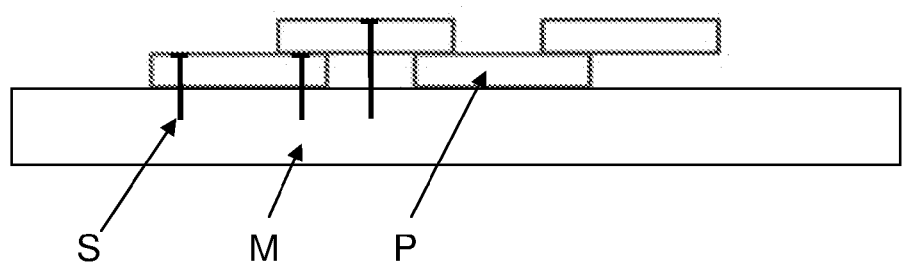
FIG. 10 illustrates an alternative mounting method with partially overlapping planks.

In FIG. 10, an alternative mounting method is illustrated with partially overlapping fiber cement boards/planks P on an underlying material M, typically wood. Analogously with the imbricated configuration, there is also a risk for breakage and cracks in this partially overlapping configuration because the cavity underneath the top planks is at risk for deformation that causes tensile stress. Also in this case, the screw according to the invention reduces the risk for damage. Even for the left plank in the drawing, the screw S has an advantage of reducing risk for breakage, especially close to the edge or corners, despite no cavity under the plate.

What is claimed is:

1. A method for fastening a fiber cement plank against an underlying base material, the method comprising the steps of: placing the fiber cement plate against the underlying base material, and drilling a screw with a drill tip through the fiber cement plate and screwing the screw into the underlying base material; the screw having a first and second end and an axis extending from the first to the second end; wherein the screw at the first end is provided with a drill tip and at the second end with a head (G); wherein the head (G) has an upper side comprising means for cooperation with a tool and a flat underside, characterized in that that the screw comprises a head with a flat underside of the head, wherein the underside comprises milling fins (F) for milling and countersinking of the head (G) in the cement fiber plate; wherein the screw comprises a first thread (B) with a first inner diameter and a first outer diameter and a first pitch; wherein the screw includes a milling section (C) between the first thread (B) and the head (G), wherein the milling section (C) comprises means for milling with a circumscribed circle in a plane perpendicular to the axis of the screw for cutting a hole with a diameter as the circumscribed circle; wherein the circumscribed circle has a diameter larger than the first inner diameter; wherein the screw comprises a second thread (E) between the milling section (C) and the head (G) wherein this second thread (E) has a second inner diameter and a second outer diameter and a second pitch; wherein the second inner diameter is larger than the first inner diameter, and the second outer diameter is larger than the first outer diameter; wherein the method comprises drilling and screwing the screw with a first thread into the underlying base material while simultaneously screwing the screw with a second thread into the fiber cement plate, continuing screwing the screw into the fiber cement plate until the head is stopped by the counterforce of the fiber cement plate with the head being countersunk in the fiber cement plate with the upper side of the head being flush with a surface of the fiber cement plate or countersunk below the surface.

2. A method according to claim 1, wherein the method comprises fastening a plurality of fiber cement planks in imbricated or otherwise only partially overlapping configuration; the method comprising positioning a second plank on top of a first plank, the second plank abutting the surface of the first plank in only partially overlapping configuration such that only part of the width of the second plank abuts the underlying first plank; and covering the screws in the first plank.

3. A screw for fastening a fiber cement plank against an underlying base material wherein the screw has a first and second end and an axis extending from the first to the second end; wherein the screw at the first end is provided with a drill tip and at the second end with a head (G); wherein the head (G) has an upper side comprising means for cooperation with a tool and a flat underside comprising milling fins (F) on the flat underside for milling and countersinking of the head (G); wherein the screw comprises a first thread (B) with a first inner diameter and a first outer diameter and a first pitch; wherein the screw includes a milling section (C) between the first thread (B) and the head (G), wherein the milling section (C) comprises means for milling with a circumscribed circle in a plane perpendicular to the axis of the screw for cutting a hole with a diameter as the circumscribed circle; wherein the circumscribed circle has a diameter larger than the first inner diameter; wherein the screw comprises a second thread (E) between the milling section (C) and the head (G) where this second thread (E) has a second inner diameter and a second outer diameter and a second pitch; wherein the second inner diameter is larger than the first inner diameter, and the second outer diameter is larger than the first outer diameter.

4. A screw according to claim 3, wherein the second thread (E) has an progressively increasing inner diameter and outer diameter in a direction from the milling means (C) and towards the head (G), and wherein the second inner diameter is the maximum inner diameter of the second thread (E), and the second outer diameter is the maximum outer diameter of the second thread (E).

5. A screw according to claim 3, wherein the screw comprises the following parameters:
Length of screw: 20-100 mm
Length of drill tip: 4-24 mm
Length of the first thread: 12-75 mm
Length of the milling section: 3-15 mm
Length of the second thread: 4-30 mm.

6. A screw according to claim 5, wherein the screw comprises the following parameters:
Length of screw: 30-50 mm
Length of drill tip: 6-10 mm
Length of the first thread: 20-40 mm
Length of the milling section: 3-7 mm
Length of the second thread: 4-30 mm.

7. A screw according to claim 3, wherein the head (G) has an internal slot for cooperation with a screwing tool.

8. A screw according to claim 7, wherein the slot is one of a TORX® notch, a square and a crossed slot.

9. A screw according to claim 3, wherein the ratio between the diameter of the head (G) and the diameter of the largest circle circumscribed around the fins is 1.05-1.40.

10. A screw according to claim 3, wherein the ratio between the thickness of the head (G) and the inner diameter of the second thread is 0.1-0.3.

11. A screw according to claim 3, wherein the head (G) has a diameter that is 1.2-2.0 times as wide as the inner diameter of the second thread.

12. A screw according to claim 3, wherein the pitch of the second thread (E) is between 1% and 25% less than the pitch of the first thread (B).

13. A screw according to claim 12, wherein the pitch of the second thread (E) is between 1% and 5% less than the pitch of the first thread (B).

14. A screw according to claim 3, wherein the second thread (E) from the milling section (C) to the head (G) comprises a winding of less than four full turns.

15. A screw according to claim 3, wherein at least two windings of the second thread (E) are provided on a stem where it has an increasing diameter towards the head (G).

* * * * *